(12) United States Patent
Abushawashi et al.

(10) Patent No.: US 11,458,920 B2
(45) Date of Patent: Oct. 4, 2022

(54) APPARATUS AND METHOD FOR SECURING A GLOVE BOX LID IN A CLOSED POSITION

(71) Applicant: FORD GLOBAL TECHNOLOGIES, LLC, Dearborn, MI (US)

(72) Inventors: Yalla Mussa Abushawashi, Canton, MI (US); Marwan Ahmad Elbkaily, Canton, MI (US); Matt James Enciso, Dearborn Heights, MI (US); Abdelrahim Khal, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1129 days.

(21) Appl. No.: 16/025,470

(22) Filed: Jul. 2, 2018

(65) Prior Publication Data
US 2020/0001814 A1   Jan. 2, 2020

(51) Int. Cl.
*B60R 21/045* (2006.01)
*B60R 7/06* (2006.01)
*E05C 3/02* (2006.01)

(52) U.S. Cl.
CPC .............. *B60R 21/045* (2013.01); *B60R 7/06* (2013.01); *E05C 3/02* (2013.01)

(58) Field of Classification Search
CPC ........... B60R 21/045; B60R 7/06; B60R 7/00; E05C 3/02; E05B 77/04; E05B 77/06
See application file for complete search history.

(56) References Cited

U.S. PATENT DOCUMENTS

| | | | |
|---|---|---|---|
| 4,743,060 A | 5/1988 | Hishida | |
| 7,607,727 B2* | 10/2009 | Park | E05B 77/04 |
| | | | 292/231 |
| 8,191,953 B2 | 6/2012 | Simon et al. | |
| 9,522,645 B1* | 12/2016 | Roychoudhury | B29C 65/20 |
| 9,771,743 B2 | 9/2017 | Roychoudhury et al. | |
| 2009/0322103 A1* | 12/2009 | Park | E05B 83/28 |
| | | | 292/277 |

FOREIGN PATENT DOCUMENTS

| | | | | |
|---|---|---|---|---|
| CN | 202986980 U | 6/2013 | | |
| CN | 110239445 A * | 9/2019 | | |
| DE | 102011053395 A1 * | 3/2013 | ............... | B60N 2/43 |
| DE | 102016116790 A1 * | 3/2017 | ............... | B60N 2/43 |
| JP | 2000110433 A | 4/2000 | | |

(Continued)

OTHER PUBLICATIONS

English Machine Translation of JP2000110433A.
(Continued)

*Primary Examiner* — Kristina R Fulton
*Assistant Examiner* — James E Ignaczewski
(74) *Attorney, Agent, or Firm* — Vichit Chea; Price Heneveld LLP

(57) ABSTRACT

An apparatus includes a stop carried on a glove box lid and a lever including an abutment, a catch and a fulcrum. The lever is displaceable about the fulcrum between a rest position and a deployed position. In the deployed position the catch engages the stop preventing the glove box lid from opening. A method of securing the glove box lid in a closed position in the event of an impact to a motor vehicle is also provided.

9 Claims, 7 Drawing Sheets

(56) References Cited

FOREIGN PATENT DOCUMENTS

| KR | 1998037807 A | | 8/1998 |
|---|---|---|---|
| KR | 20040066357 A | | 7/2004 |
| KR | 20040110172 A | | 12/2004 |
| KR | 20100021878 A | * | 2/2010 |
| KR | 101193626 B1 | | 10/2012 |

OTHER PUBLICATIONS

English Machine Translation of KR1998037807A.
English Machine Translation of KR20040110172A.
English Machine Translation of KR20040066357A.
English Machine Translation of KR101193626B1.
English Machine Translation of CN202986980U.

* cited by examiner

APPARATUS AND METHOD FOR SECURING A GLOVE BOX LID IN A CLOSED POSITION

TECHNICAL FIELD

This document relates generally to the motor vehicle equipment field and, more particularly, to an apparatus and method for securing a glove box lid in a closed position in the event of a frontal impact that releases the glove box lid latch.

BACKGROUND

The impact force of certain motor vehicle collisions may cause the glove box lid latch to fail, allowing the glove box lid to open and the contents therein to be thrown around the interior of the motor vehicle. For example, a frontal impact of sufficient force may cause the dash panel of the motor vehicle to intrude into the passenger compartment pushing a component of the motor vehicle, such as the heating, ventilation and air conditioning (HVAC) case into the lower rail: that is, a steel structure and important component for glove box integrity as that rail supports the glove box lid hinges. This may lead to glove box lid latch failure.

This document relates to a new and improved apparatus and method for securing a glove box lid in a closed position even in the event of a frontal impact that results in glove box lid latch failure.

SUMMARY

In accordance with the purposes and benefits as described herein, a new and improved apparatus is provided for securing a glove box lid closed in the event of an impact to the motor vehicle even if that impact causes failure of the glove box lid latch. That apparatus comprises a stop carried on the glove box lid and a lever. The lever includes an abutment, a catch and a fulcrum. The lever is displaceable about the fulcrum between (a) a rest position, wherein the catch is maintained outside the path of the stop as the glove box lid is opened and closed, and (b) a deployed position wherein the catch engages the stop preventing the glove box lid from opening.

The catch may be provided at a first end of the lever. The abutment may be provided at a second end of the lever. The fulcrum may be provided beside the abutment at the second end of the lever. In one of the many possible embodiments of the apparatus, the fulcrum may be a weld connecting the lever to a motor vehicle support such as the lower rail of the motor vehicle.

The apparatus may further include an HVAC case that engages the abutment in the event of a motor vehicle frontal impact. This engagement causes the lever to pivot about the fulcrum and displaces the lever from the rest position to the deployed position.

The lever may further include an S-curve whereby the catch is offset from the abutment. That S-curve may be positioned between the fulcrum and the catch. Further, the fulcrum and the abutment may be aligned along a first line while the fulcrum and the catch may be aligned along a second line. That first line may form an included angle with the second line of between about 75 and 90 degrees. In one particularly useful embodiment, the first line forms an included angle with the second line of about 90 degrees.

In accordance with an additional aspect, a method is provided of securing a glove box lid in a closed position in the event of an impact to a motor vehicle. That method comprises the steps of: (a) connecting a lever to a motor vehicle support with a fulcrum, (b) displacing the lever from a rest position to a deployed position in response to the impact and (c) engaging a stop of the glove box lid with a catch on the lever when the lever is in the deployed position thereby securing the glove box lid in a closed position.

The method may be further described as including the step of engaging an abutment of the lever with an HVAC case of the motor vehicle as the HVAC case is displaced rearwardly in response to the impact. The method may also include the step of pivoting the lever about the fulcrum and thereby displacing the lever from the rest position to the deployed position.

In addition, the method may include the additional step of providing the lever with an S-Curve. Still further, the method may include the step of offsetting the catch from the abutment.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

FIGS. 1a-1c are a series of detailed views illustrating the lever of the apparatus.

More particularly, FIG. 1a is a front perspective view of the lever.

Reference will now be made in detail to the present preferred embodiments of the apparatus and the method, examples of which are illustrated in the accompanying drawing figures.

DETAILED DESCRIPTION

Reference is now made to FIGS. 1a-1c, 2a, 2b, 3a and 3b which, when considered together, illustrate the new and improved apparatus 10 for securing a glove box lid 12 in a closed position in the event of an impact such as a frontal impact to a motor vehicle. As illustrated in FIGS. 2a, 2b, 3a and 3b, the glove box lid 12 includes a stop 14 that projects outwardly from a sidewall 16 of the glove box lid.

Figure 1A:
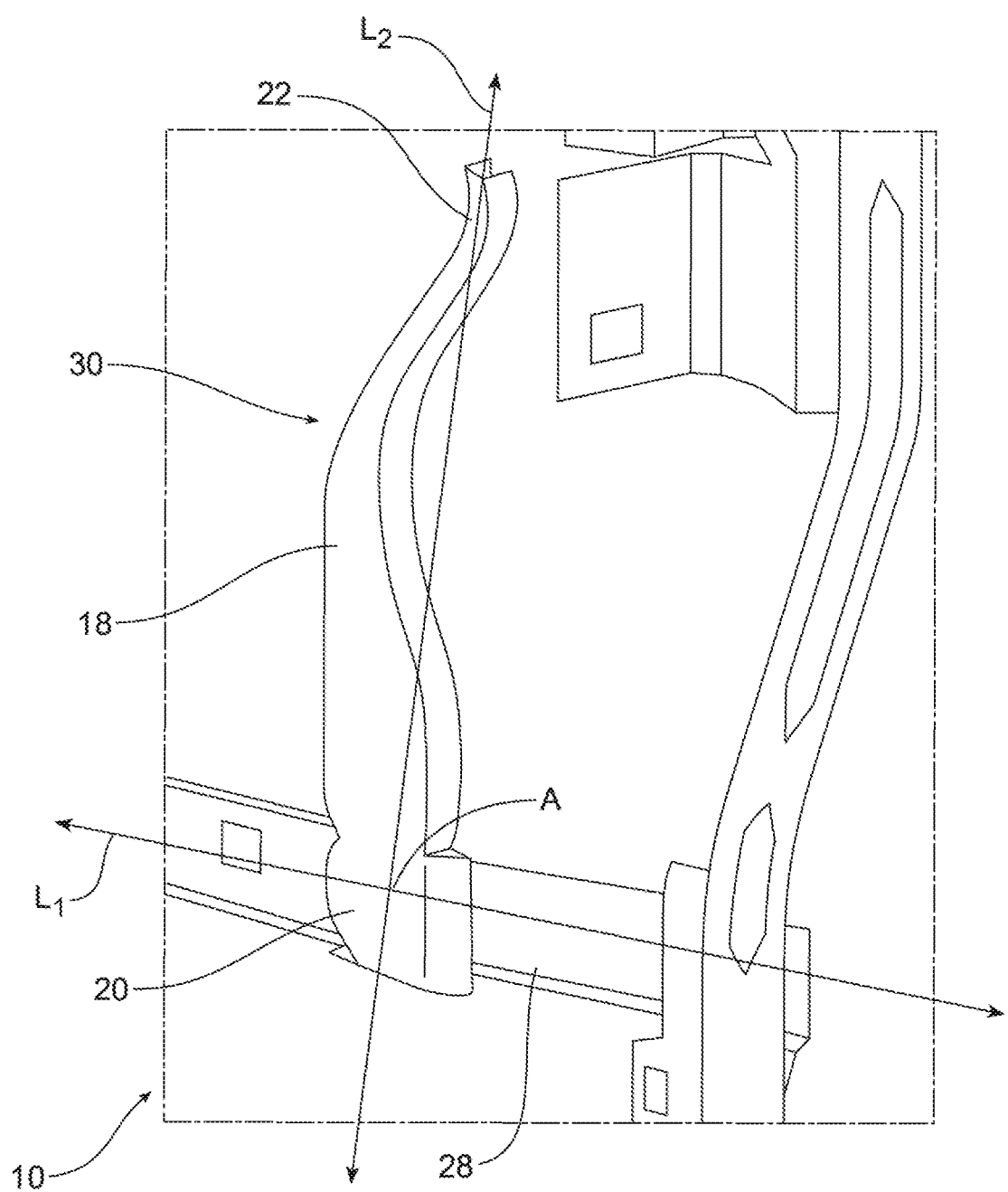
FIG. 1b is a rear perspective view of the lever.
FIG. 1c is a bottom plan view of the lever.
Figure 1B:
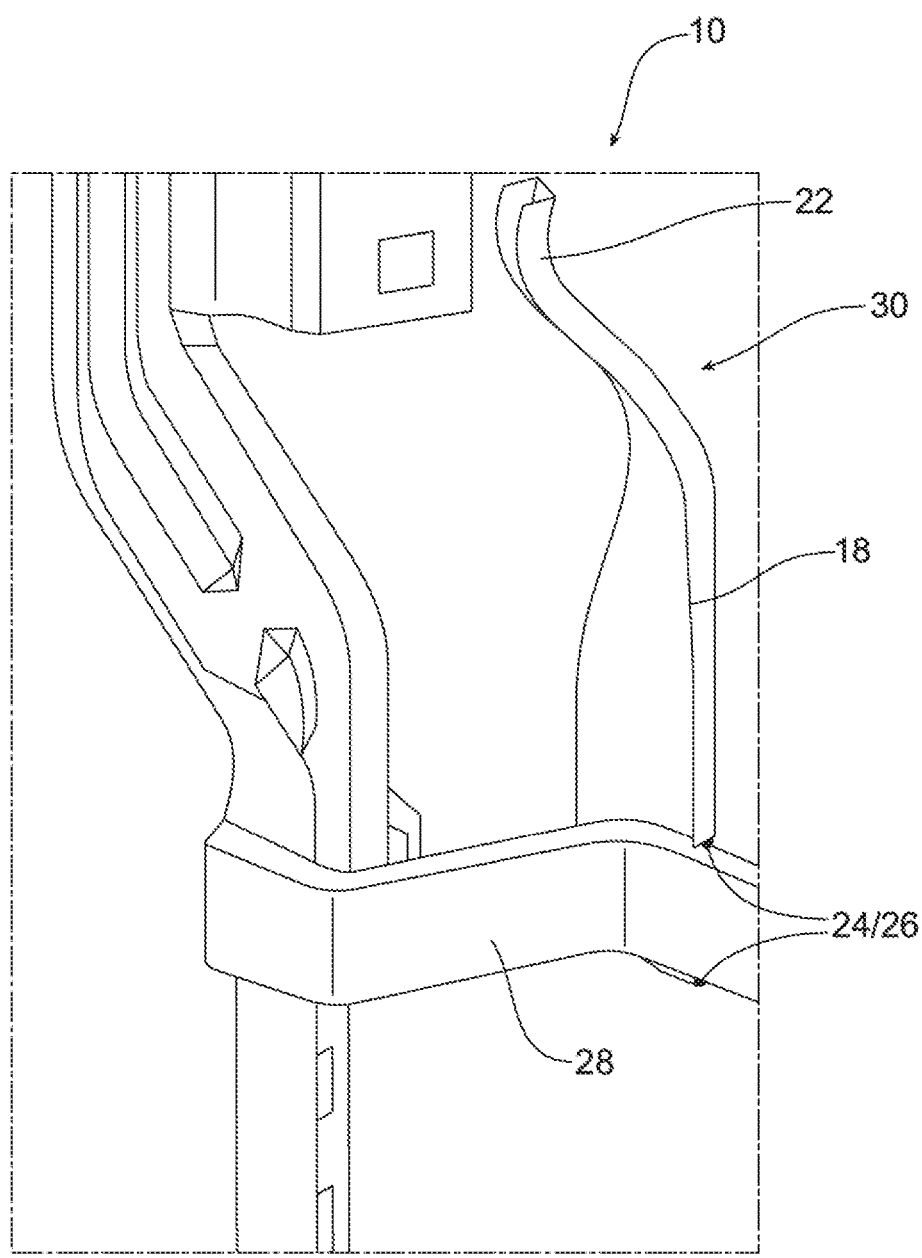
Figure 1C:
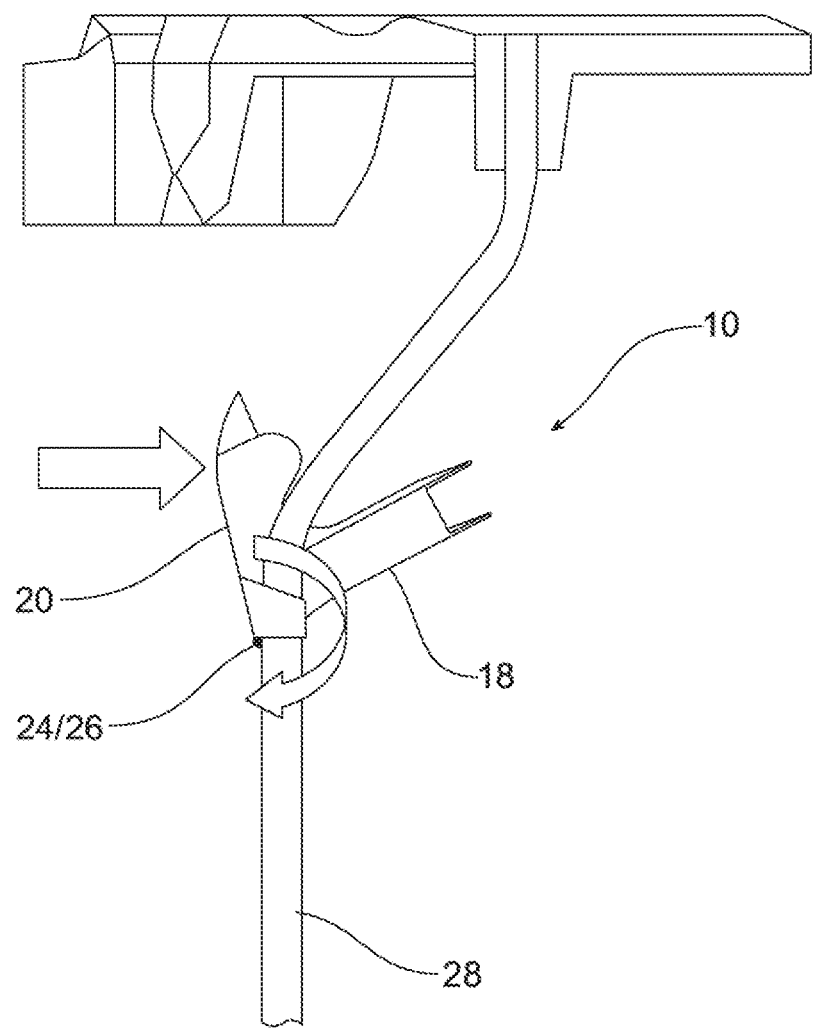

As best illustrated in FIGS. 1a-1c, the apparatus 10 also includes a lever 18. The lever 18 includes an abutment 20, a catch 22 and a fulcrum 24. As will be described in greater detail below, the lever 18 is displaceable between a rest position illustrated in FIGS. 2a and 3a and a deployed position illustrated in FIGS. 2b and 3b. More particularly, in the rest position the catch 22 of the lever 18 is maintained outboard the path of movement of the stop 14 of the glove box lid 12 as the glove box lid is displaced between the closed position and the open position. In contract, in the deployed position the catch 22 of the lever 18 is displaced into the path of the stop 14 so that the catch 22 engages the stop thereby preventing the glove box lid 12 from opening.

More specifically, as illustrated in FIGS. 1a-1c, the catch 22 is provided at a first end of the lever 18 while the abutment 20 is provided at a second end of the lever. The fulcrum 24 is provided beside the abutment at the second end of the lever. Thus, it should be appreciated that the fulcrum 24 and the abutment 20 are aligned on a first line $L_1$ while the fulcrum and the catch 22 are aligned on a second line $L_2$. That first line $L_1$ forms an included angle A with the second line $L_2$ of between about 75 and 90 degrees. In the illustrated embodiment the first line $L_1$ forms an included angle with the second line $L_2$ of about 90 degrees.

In the illustrated embodiment, the fulcrum 24 is a weld 26 connecting the lever 18 to a motor vehicle support which in the illustrated embodiment, is the lower rail 28. In other possible embodiments, the fulcrum 24 may comprise a pivot pin or other appropriate structure. Here it should be noted that the hinge/fulcrum axis is substantially aligned with the longitudinal axis of the lever 18, not across or transverse with respect to the longitudinal axis of the lever.

As further illustrated in FIGS. 1a-1c, the lever 18 includes an S-Curve, generally designated by reference numeral 30, whereby the catch is offset from the abutment 20. In the illustrated embodiment, the S-Curve 30 is positioned between the fulcrum 24 and the catch 22.

Figure 2A:
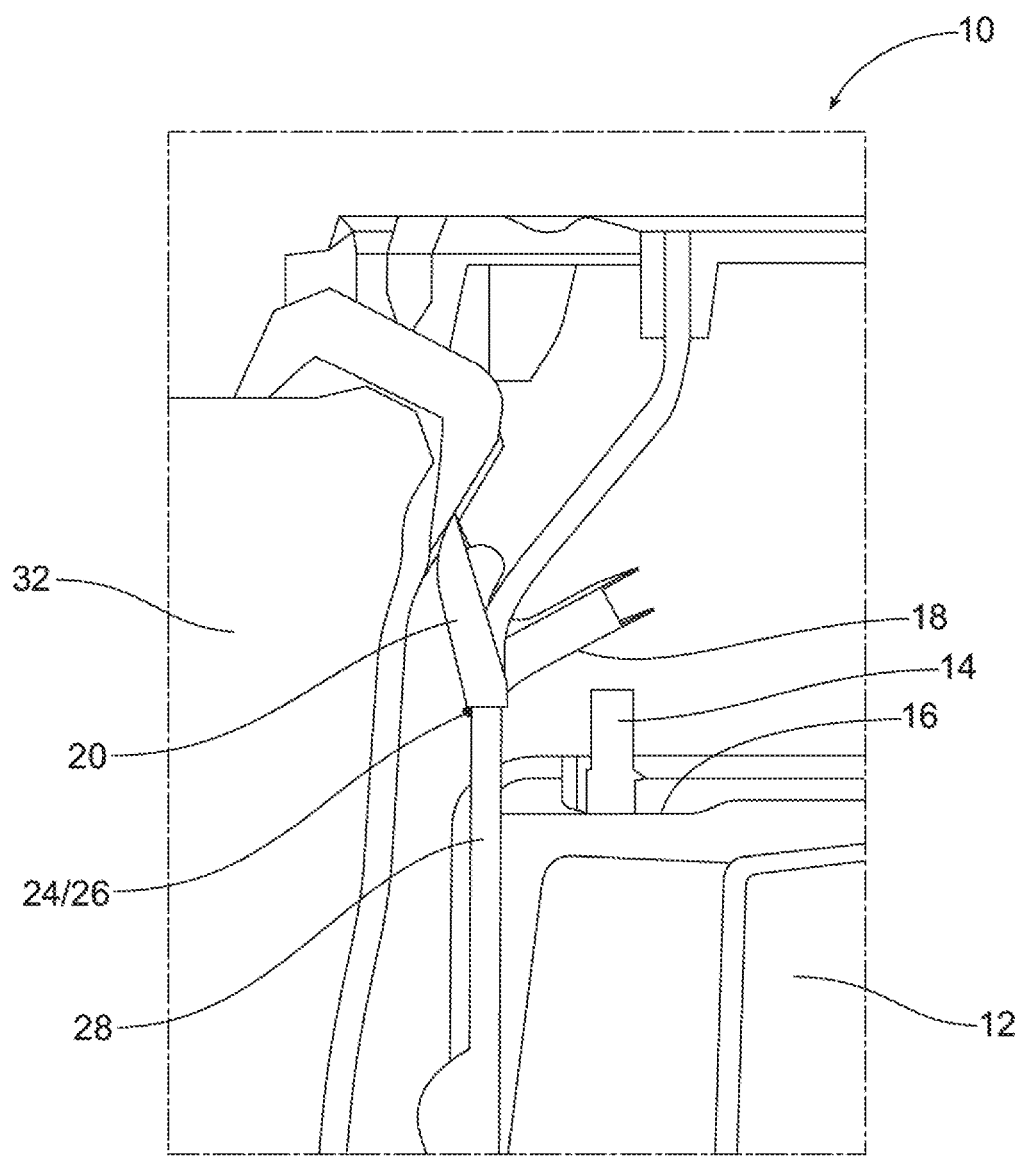
FIG. 2a is a detailed perspective view illustrating the HVAC case, the glove box lid, including the stop carried on the glove box lid, and the lever which is shown in the rest position.
Figure 2B:
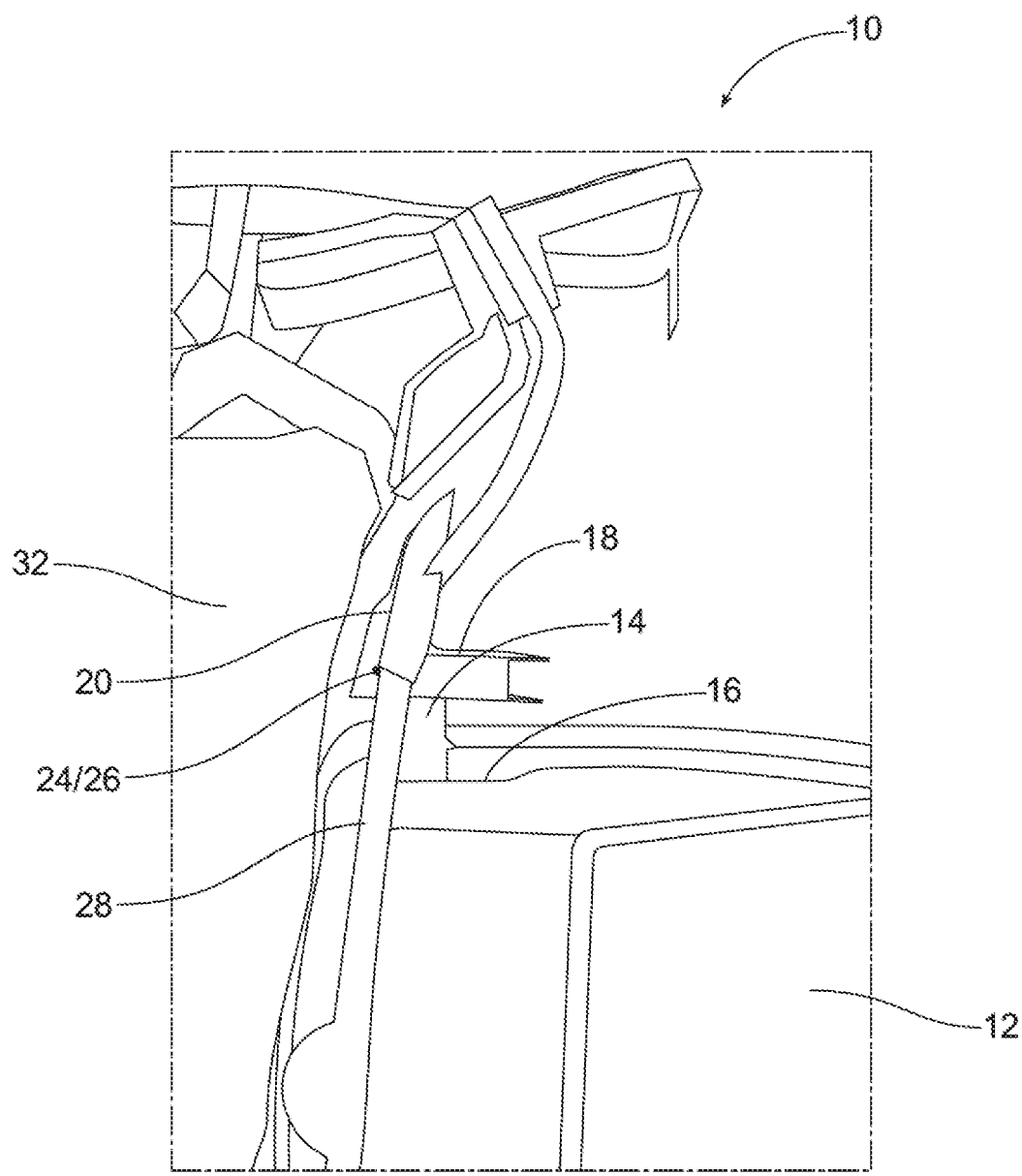
FIG. 2b is a view similar to FIG. 2a but illustrating the intrusion of the HVAC case which engages and causes the lever to pivot about the fulcrum into the deployed position so that the catch on the lever engages the stop on the glove box lid thereby preventing the glove box lid from opening.
Figure 3A:
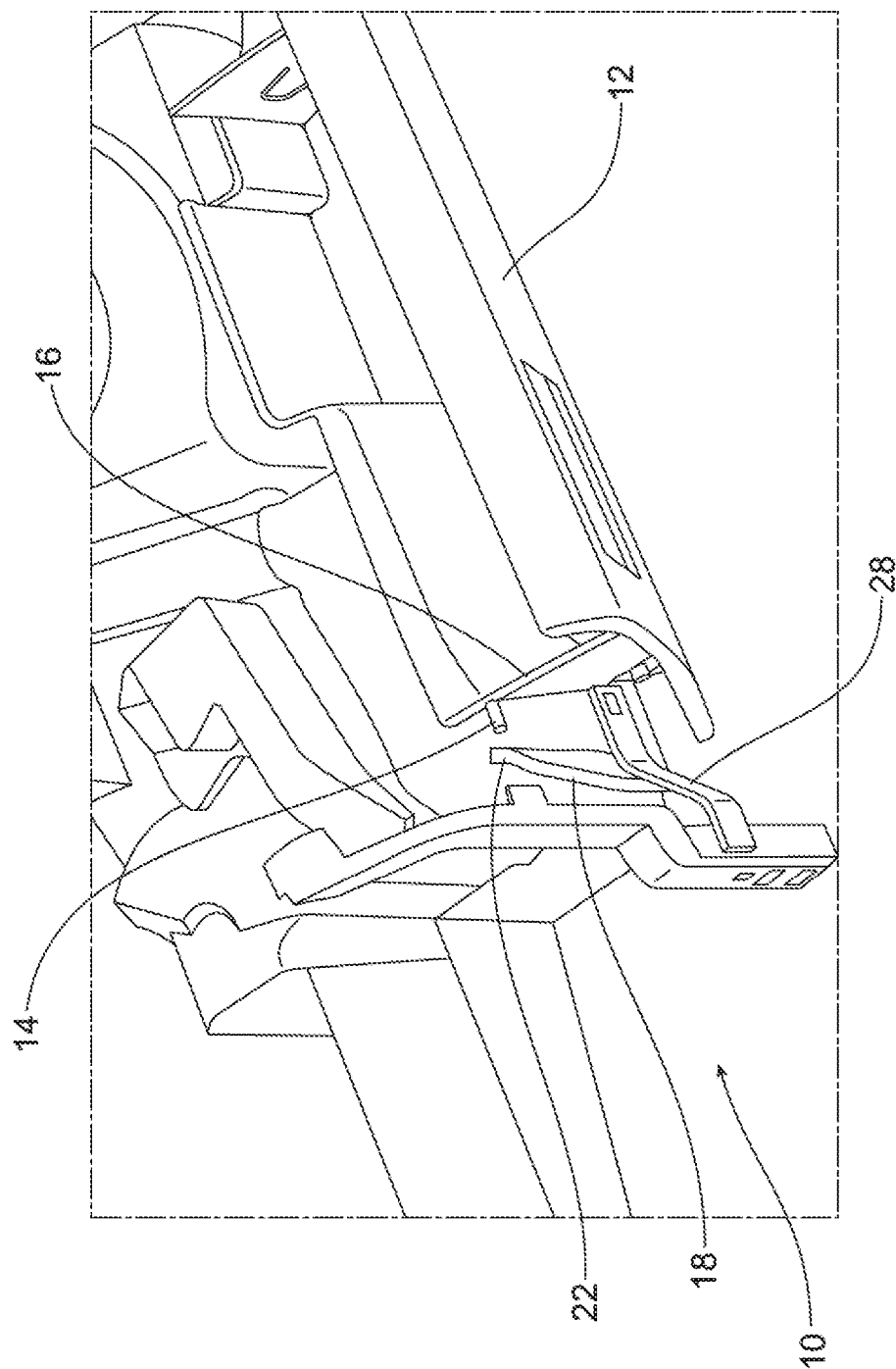
FIG. 3a is a perspective view illustrating the glove box lid in the closed position and the lever in the rest position.
Figure 3B:
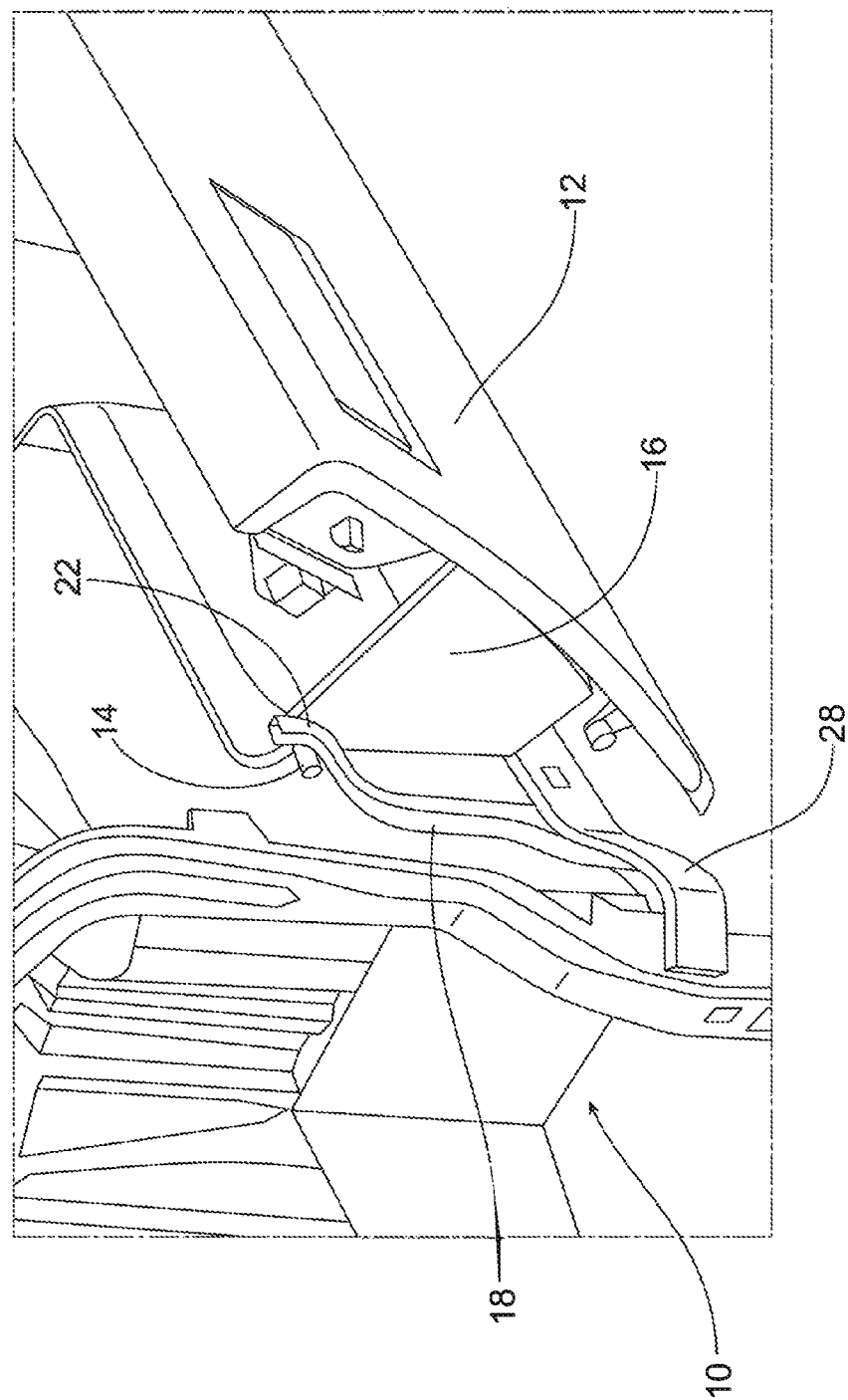
FIG. 3b illustrates rearward intrusion of the HVAC case which engages the abutment of the lever causing the lever to pivot about the fulcrum into the deployed position wherein the catch on the lever engages the stop on the glove box lid preventing the glove box lid from opening.

As illustrated in FIGS. 2a, 2b, 3a and 3b, the apparatus 10 may also include an HVAC case 32. In the illustrated embodiment, the HVAC case 32 is positioned motor vehicle forward of the lower rail 28. In the event of a frontal impact of sufficient force, the HVAC case 32 is displaced rearwardly toward the lower rail 28 and, more particularly, the abutment 20 of the lever 18 which is connected to the lower rail 28 at the fulcrum 24. FIGS. 2a and 3a illustrate the HVAC case 32 in its normal operating position and the lever 18 in the rest position. FIGS. 2b and 3b illustrate the rearward displacement of the HVAC case 32 caused by a frontal impact. (Note action arrows A). As the HVAC case 32 is displaced rearwardly, the HVAC case engages the abutment 20 of the lever 18. This causes the lever 18 to pivot about the fulcrum 24 thereby displacing the lever from the rest position illustrated in FIGS. 2a and 3a to the deployed position illustrated in FIGS. 2b and 3b.

More particularly, the apparatus 10 is designed so that the force applied by the intruding HVAC case 32 is sufficient to rotate the lever 18 about the fulcrum 24 (such as by deforming the lever 18 at the weld/fulcrum 24). When the lever 18 is rotated about the fulcrum 24 by a predetermined rotation angle of, for example, greater than 9 degrees, the catch 22, which is offset by the S-Curve 30, catches the pin or stop 14 on the glove box lid 12 preventing the glove box lid from opening. The greater the rearward displacement (intrusion) of the HVAC case 32, the greater the engagement between the catch 22 and the stop 14. In this way, the apparatus 10 ensures that the glove box lid 12 remains closed regardless of the performance of the glove box lid latch system (not shown).

Consistent with the above description, a method is provided for securing a glove box lid 12 in a closed position in the event of an impact to the motor vehicle. That method comprises the steps of: (a) connecting the lever 18 to a motor vehicle support, such as the lower rail 28, with a fulcrum 24, (b) displacing the lever from a rest position, as illustrated in FIGS. 2a and 3a, to a deployed position, as illustrated in FIGS. 2b and 3b, in response to the impact and (c) engaging the stop 14 on the glove box lid with the catch 22 on the lever when the lever is in the deployed position.

The method may further include the step of engaging the abutment 20 of the lever 18 with the HVAC case 32 as the HVAC case is displaced rearwardly in response to the impact. In addition the method may include the step of pivoting the lever 18 about the fulcrum 24 and thereby displacing the lever from the rest position to the deployed position.

In addition, the method may include the step of providing the lever 18 with an S-curve 30 which functions to offset the catch 22 from the fulcrum and the abutment 20. The S-curve 30 ensures that the catch 22 on the lever 18 is positioned outside of the path of travel of the stop 14 when the lever is in the rest position thereby allowing normal operation of the glove box lid 12 and access to the contents of the glove box. In contrast, the S-shaped curve 30 also ensures that the catch 22 on the lever 18 is positioned in the path of travel of the stop 14 when the lever is in the deployed position thereby preventing the glove box lid 12 from opening in the event of a frontal impact.

In summary, numerous benefits are provided by the new and improved apparatus 10 and related method for securing a glove box lid 12 in a closed position in the event of a failure of the glove box lid latch due to a frontal impact. More particularly, the lever 18 of the apparatus is pivoted about the fulcrum 24 so as to be displaced from a rest position to a deployed position. In the deployed position, the catch 22 on the lever engages with a stop 14 on the glove box lid 12 to thereby prevent the glove box lid from opening. This effectively maintains the contents of the glove box within the glove box, preventing them from becoming crash-energy-charged free projectiles in the passenger compartment of the motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:
1. An apparatus, comprising:
a stop carried on a glove box lid; and
a lever including an abutment, a catch and a fulcrum, said lever being displaceable about said fulcrum between (a) a rest position and (b) a deployed position wherein said catch engages said stop preventing said glove box lid from opening, wherein said catch is at a first end of said lever and said abutment is at a second end of said lever, wherein said fulcrum is beside said abutment at said second end of said lever, wherein said lever includes an S-curve whereby said catch is offset from said abut- ment, and wherein said S-curve is positioned between said fulcrum and said catch.

2. The apparatus of claim 1, wherein said fulcrum is a weld connecting said lever to a motor vehicle support.

3. The apparatus of claim 1, wherein said motor vehicle support is a lower rail.

4. The apparatus of claim 2, further including an HVAC case that engages said abutment in event of a motor vehicle frontal impact, causing said lever to pivot about said fulcrum displacing said lever from said rest position to said deployed position.

5. The apparatus of claim 1, wherein said fulcrum and said abutment are aligned on a first line and said fulcrum and said catch are aligned on a second line.

6. The apparatus of claim 5, wherein said first line forms an included angle with said second line of between about 75 and 90 degrees.

7. The apparatus of claim 5, wherein said first line forms an included angle with said second line of about 90 degrees.

8. A method of securing a glove box lid in a closed position in event of a frontal impact to a motor vehicle, comprising:
- connecting a lever to a motor vehicle support with a fulcrum, wherein said lever has an S-curve;
- displacing said lever from a rest position to a deployed position in response to said impact;
- engaging a stop on said glove box lid with a catch on said lever when said lever is in said deployed position; and
- pivoting said lever about said fulcrum and thereby displacing said lever from said rest position to said deployed position, including offsetting said catch from said abutment, wherein said S-curve is positioned between said fulcrum and said catch.

9. The method of claim 8, including engaging an abutment of said lever with an HVAC case of said motor vehicle as said HVAC case is displaced rearwardly in response to said frontal impact.

* * * * *